Jan. 12, 1954

L. HOFFMAN 2,665,603

TESTING MACHINE CLAMPING DEVICE

Filed Jan. 20, 1950

INVENTOR.
LEO HOFFMAN

BY
Hammond & Littell
ATTORNEYS

Jan. 12, 1954   L. HOFFMAN   2,665,603
TESTING MACHINE CLAMPING DEVICE
Filed Jan. 20, 1950   4 Sheets-Sheet 3
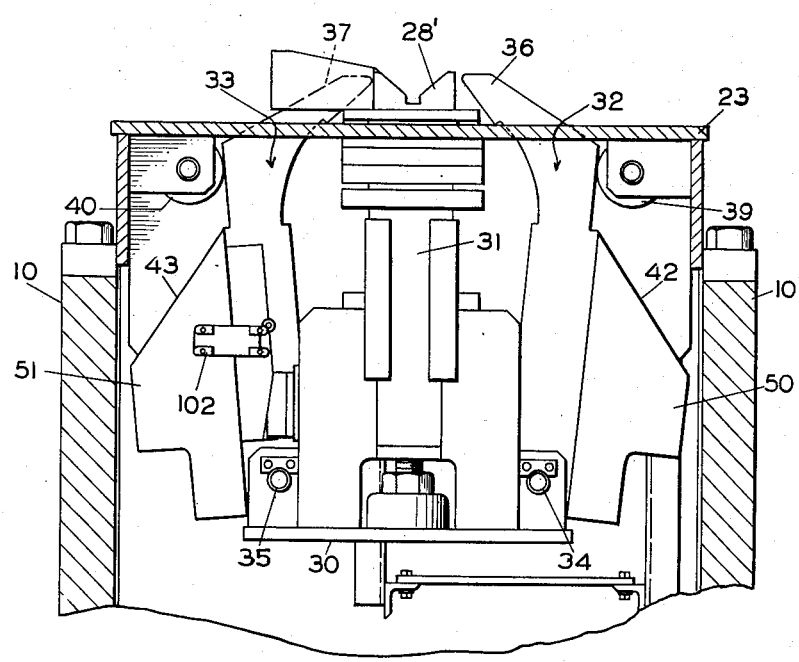
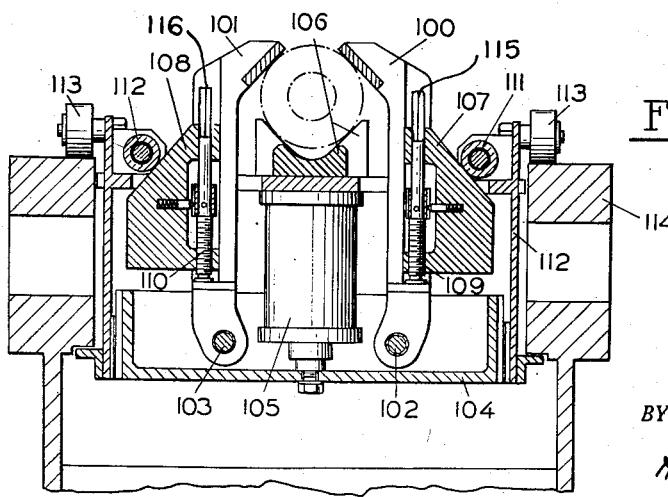
INVENTOR.
LEO HOFFMAN
BY
Hammond & Littell
ATTORNEYS INVENTOR.
LEO HOFFMAN
BY
Hammond & Littell
ATTORNEYS

Patented Jan. 12, 1954

2,665,603

UNITED STATES PATENT OFFICE 2,665,603

TESTING MACHINE CLAMPING DEVICE

Leo Hoffman, New York, N. Y., assignor to Hydropress, Incorporated, New York, N. Y., a corporation of Delaware Application January 20, 1950, Serial No. 139,708

9 Claims. (Cl. 81—17.2)

This invention relates to a device for clamping articles such as pipes, tubes, and the like and is particularly concerned with a clamping device suitable for use with a machine for testing the mechanical strength and fluid tightness of pipes, tubes, and the like.

In previous devices, arrangements have been provided for placing pipes between two sealing heads, the sealing heads being movable inwardly relative to each other so as to fit against or over the ends of the pipe. Thereafter, hydraulic fluid pressure is applied to the interior of the tube for the purpose of testing the mechanical strength and fluid tightness of said tube.

In the testing of pipes or the like in a machine similar to that just mentioned, the pipe is moved to a position in alignment with the sealing heads. One of the sealing heads may be mounted on a hydraulic ram in a stationary housing at one end of the machine, and the other sealing head may be mounted on a shiftable carriage at the other end of the machine, said carriage being shiftable along the frame of the machine. The shiftable carriage sealing head may be stationary relative to the shiftable carriage or may be movable relative thereto by means of a hydraulic ram or other movable means mounted on the shiftable carriage.

When the pipe is moved to its position in alignment with the two sealing heads, it is necessary to clamp the pipe so as to hold it while the sealing heads are moved inwardly into sealing relationship with the pipe ends. Also, the pipe should be held while the sealing heads separate upon completion of testing. The pipe may be loaded in any suitable manner into position on the support or saddle therefor of the clamping carriage.

A machine in which the clamping means of the present invention is particularly adaptable for use is illustrated in copending application, Serial No. 139,559, filed January 20, 1950.

One of the objects of the present invention is to provide an improved clamping means for clamping the pipe in a machine such as the aforementioned testing machine.

Still another of the objects of the invention is to provide a clamping means retractable so that articles can be moved to and from the article support without interference with the clamping means, the device occupying a minimum of height.

It is desirable that the clamping arms be arranged so that they will move below the level of the article support in order to permit the articles to be loaded and unloaded with ease, especially where they are heavy, and it is advantageous to be able to roll them onto the support. Also, in many instances, the height available for mounting the clamping means is limited.

In a preferred form, a pair of clamping arms are arranged so that as they are moved upwardly relative to the axis of the pipe to be clamped and over the same, the arms will be moved inwardly relative to each other to engage and hold the pipe, a motor for operating the same being located between the arms or below the level of the saddle or article support. In the retracted position, the arms are below the level of the pipe and its support. The arms can be pivoted on a reciprocable or movable means which when it is moved in one direction will cause engagement of the arms with cam means for the purpose of moving the arms, preferably a single operating means being used. Counterweights may be employed to move the arms outwardly as the reciprocable means is moved in the other direction. The action of the cams and weights can be reversed. By employing inturned arms pivoted on a reciprocable operating means, together with cam means moving the arms inwardly, the force exerted by the arms during the actual clamping of the pipe can be arranged to be opposite to that exerted by the motor moving the operating means toward the pipe. Also, the angles of the engaging surfaces involved can be made such that the continuing action will cause a large portion, for example 80%, of the force exerted by the motor to be utilized in clamping and holding the pipe on the support.

It is to be understood that although the invention is described particularly in conjunction with a pipe testing machine, that it can be used to clamp other articles for other similar purposes. Also, the clamping means can be located with its axis horizontal or vertical and the terms "above" or "below" relate to either arrangement.

Other objects, features, and advantages of the invention will become apparent from the following drawings and descriptions which are merely exemplary.

In the drawings:

Figure 3 is a sectional view of a fixed clamping carriage, a pair of clamping arms being shown in retracted position.

Figure 8 is a fragmentary sectional view of still another form of the invention.

Figure 9 is a fragmentary view partially in section of a modification of Figure 8.

Figure 1:
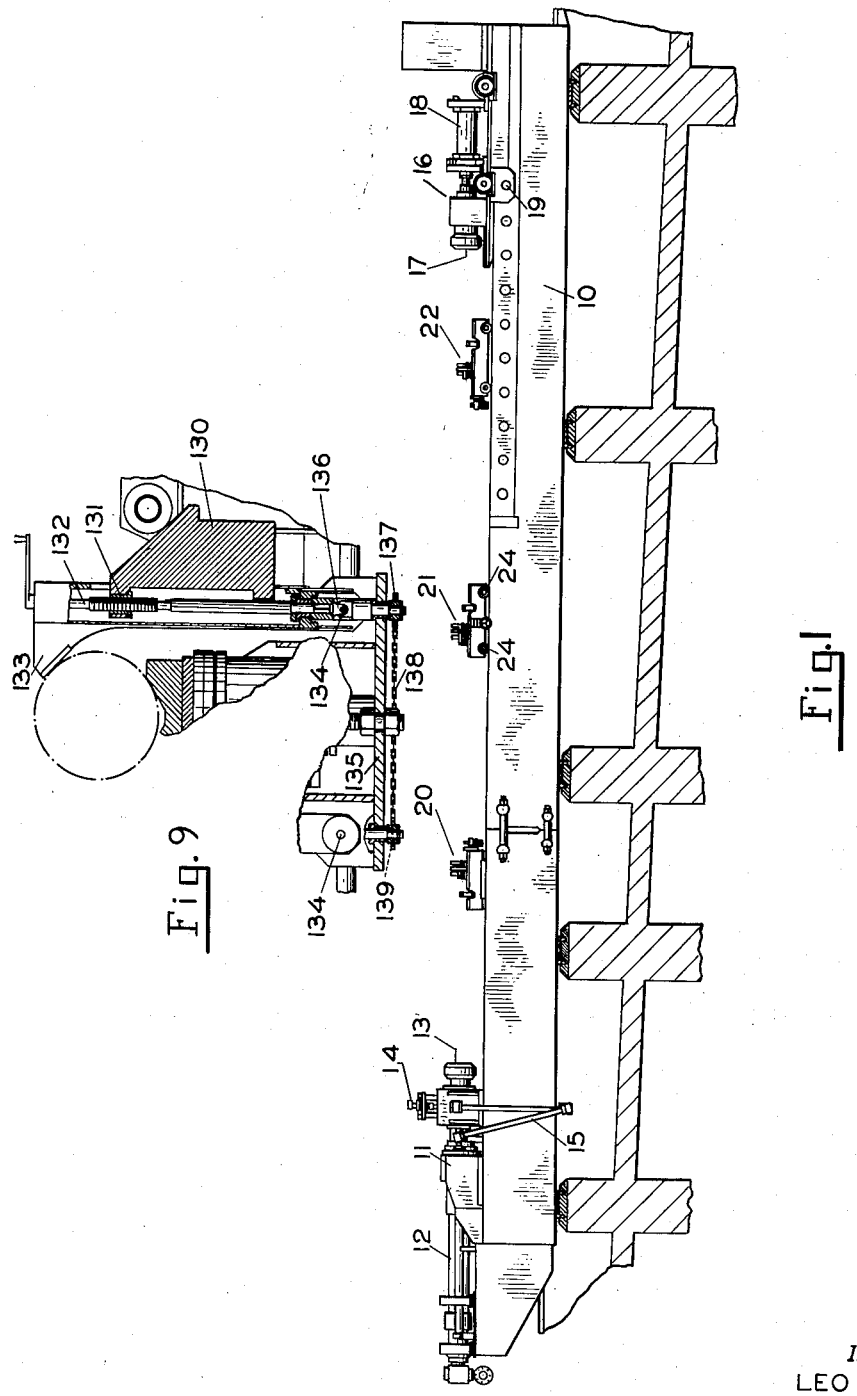
Figure 1 is a schematic side elevation of one type of machine with which the invention can be employed.

As mentioned previously, the invention will be described in conjunction with a tube testing machine, although it can be used for other purposes. Such a machine is illustrated in Figure 1 wherein frame 10 may have a stationary housing 11 mounted at one end thereof, said stationary housing having a hydraulic ram or motor 12 for moving the sealing head 13 relative to frame 10. A suitable valve arrangement 14 may be employed for the purpose of controlling the flow of testing fluid to a pipe sealed in head 13, supply line 15 being employed for supplying fluid to valve 14.

A shiftable carriage 16 is spaced from the stationary housing sealing head, and shiftable carriage 16 may have a sealing head 17. Sealing head 17 preferably has hydraulic ram arrangement 18 for moving the sealing head 17 inwardly and outwardly relative to shiftable carriage 16. Locking means 19 can be furnished for adjustably locking the shiftable carriage 16 in any desired place on frame 10.

Clamping carriages 20, 21, and 22, which particularly involve the invention herein, are mounted on frame 10 for the purpose of receiving and clamping the tube to be tested in alignment with the sealing heads. In one aspect, clamping arrangements 21 and 22 may be mounted on clamping carriages movable longitudinally on frame 10 and clamping carriage arrangement 20 may be mounted on a carriage fixed on the frame 10.

Figure 2:
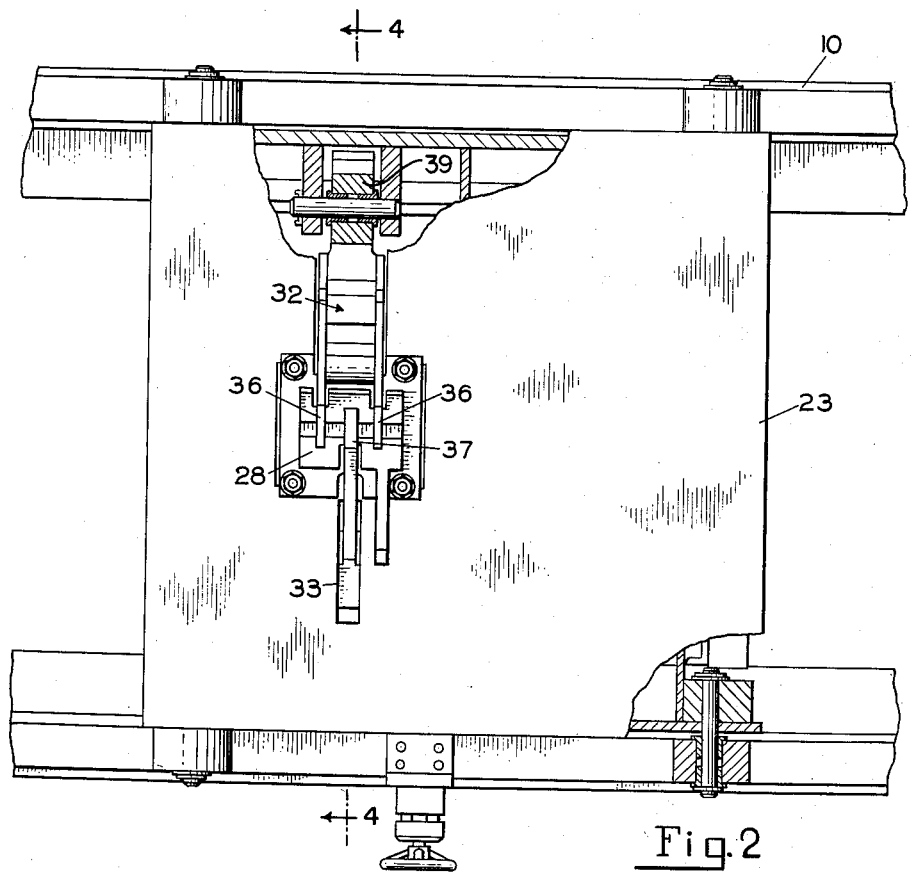
Figure 2 is a plan view of one form of the invention in conjunction with a moveable clamping carriage.

Referring to Figure 2, a movable carriage similar to that of 21 and 22 of Figure 1 will be described, the same clamping means being applicable to the fixed arrangement 20. Carriage frame 23 may have rollers 24 rollably mounted on the frame sides of the machine. Lower rollers 25 (Fig. 4) can be carried by member 26, said lower rollers 25 cooperating with an angle member or track 27 fastened to the machine frame 10 for the purpose of maintaining the carriage properly seated at all times upon the frame sides of the machine.

Saddle or support 28 of any suitable shape can be mounted on the carriage for the purpose of receiving pipe 29 to be clamped.

Reciprocable or movable means 30 is vertically movable by hydraulic motor 31 located between the saddle 28 and said reciprocable means 30, it being understood, of course, that other means for vertically reciprocating movable means 30 can be employed. In the form shown, the required head room is relatively small as compared to locating the cylinder below the means 30.

The clamping elements may comprise oscillatable or movable arms 32, 33 which can be pivotably mounted at 34, 35 on movable means 30, said arms having overlying portions 36, 37 adaptable to engage pipe 29 and hold the same in place on saddle 28. In the illustrated form, one of the clamping arms 32 comprises parallel members 36 which straddle the portion 37 of clamping arm 33 when the arms are in pipe engaging relationship.

Referring to Figure 3, arms 32 and 33 are shown in their unclamped position so that the ends 36 and 37 are separated relative to each other and are below the upper level of saddle 28', so that the feeding of pipe can be accomplished without interference. The arms 32 and 33 have counterweights 50 and 51, respectively, said counterweights being located relative to pivots 34 and 35 so that the arms, when unrestrained, will tend to move apart relative to each other. Cams or rollers 39 and 40 are mounted on carriage frame 23 and are contactable with cam surfaces 42, 43 of the clamping arms 32 and 33, respectively. The angles involved can be arranged so that the forces tending to hold the pipe in place when the arms are in clamped position will be about 80% of the potential force developed by the motor 31. Figure 3 illustrates a fixed clamping carriage, but the clamping parts are the same as Figures 2 and 4 and have been given the same numerals.

Figure 4:
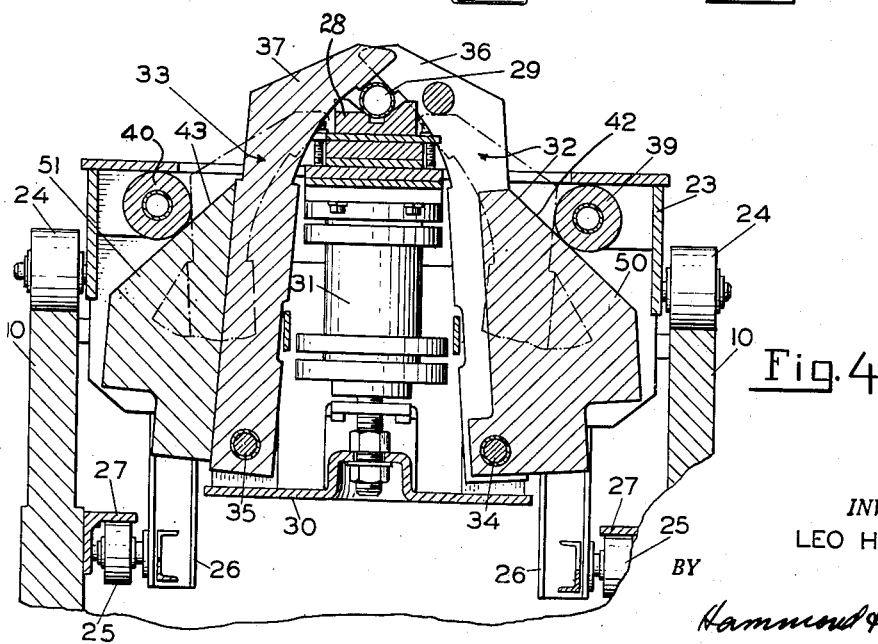
Figure 4 is a sectional view taken along the line 4—4 of Figure 2.

When hydraulic motor 31 is operated to move means 30 upwardly relative to the carriage frame 32, cam rollers 39 and 40 will cooperate with cam surfaces 42 and 43 so that clamping arms 32 and 33 will move upwardly and then inwardly relative to each other and thus move the clamping arms to the position shown in Figure 4, wherein the arms and their gripping surfaces embrace and hold pipe 29 on the saddle 28.

Thereafter, the sealing heads may move relative to the pipe, or other operations may be performed on the pipe or article according to the particular machine involved.

Upon retraction or lowering of movable means 30, the counterweights 42 and 43 will cause the arms to move outwardly relative to each other, the cams allowing such to take place.

One or any number of either fixed or movable carriages may be used in combination with each other in order to perform the desired holding function. It is evident that the hydraulic motor, or other operation mechanism for the movable means can be energized automatically or individually as desired and that it does not necessarily have to be located as shown.

Figure 6:
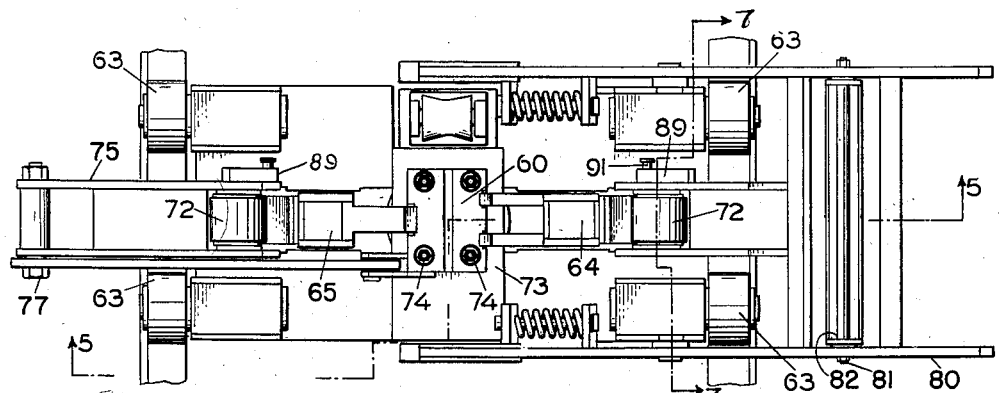
Figure 6 is a plan view of the apparatus of Figure 5.
Figure 7:
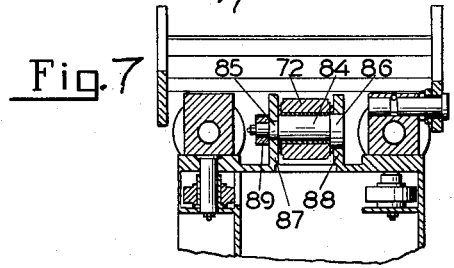
Figure 7 is a sectional view taken along the line 7—7 of Figure 6.
Figure 5:
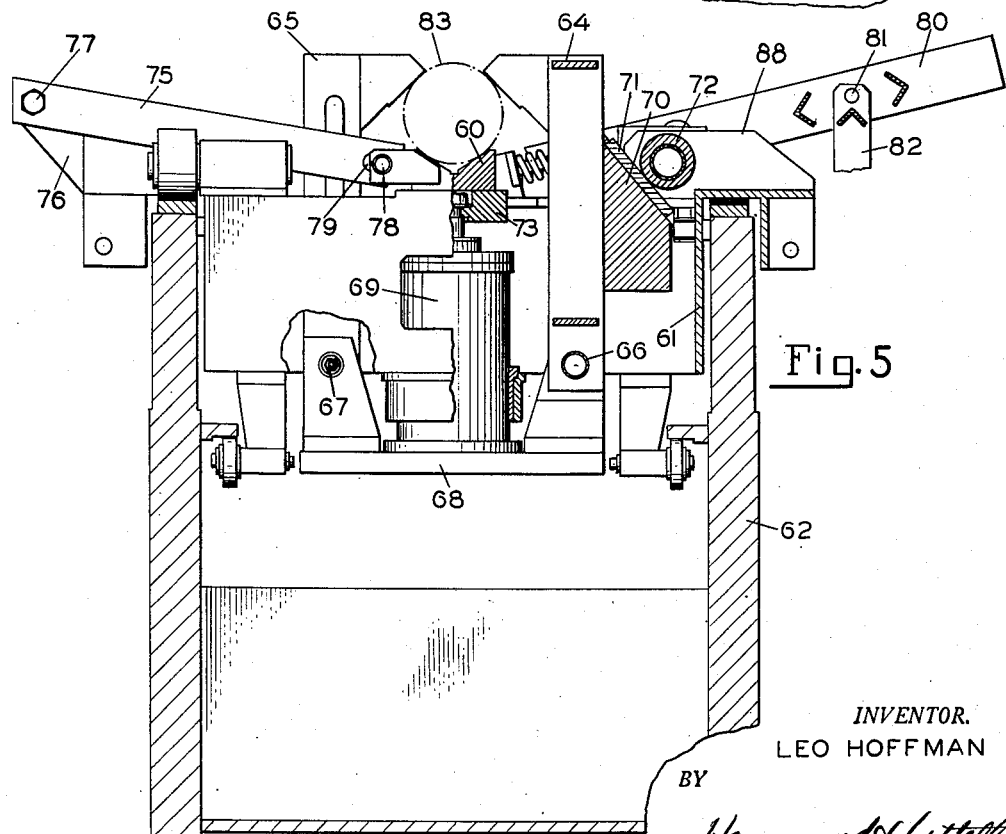
Figure 5 is a sectional view of an alternative form of the invention taken along the line 5—5 of Figure 6.

Another form of the invention is illustrated in Figures 5, 6, and 7 wherein saddle 60 is carried in a carriage frame 61, the carriage frame being movable on frame members 62 of the machine, rollers 63 (Fig. 6) being similar to those described for the previous forms of the invention. Clamping arms 64, 65 are pivotably mounted at 66 and 67 to a reciprocably movable means 68, hydraulic cylinder 69 being provided for vertical movement of the movable means 68. Counterweights 70 are mounted on the arms similar to those described for the previous forms for the purpose of causing outward movement of the clamping arms relative to each other. The counterweights 70 can have cam surfaces 71 cooperable with cam rollers 72 for causing inward movement of the clamping arms relative to each other as the movable means is reciprocated upwardly. The height of the saddle 60 in the machine may be adjusted relative to its seat 73 by means of shims placed thereunder, bolts 74 holding the saddle in place on its seat 73.

A loading guide 75 is mounted at one end to bracket 76 by bolt 77. The guide can be attached at its other end by bolt 78 to the saddle, elongated slot 79 allowing the upward movement of the saddle relative to the related parts. A similar unloading arm 80 is provided and is connected by a pivot 81 to vertical support means 82.

As arms 64 and 65 are moved upwardly by movable means 68, rollers 72 will contact cam faces 71 and cause the arms to rotate inwardly relative to each other so as to grip and clamp pipe 83 in the saddle 60. If a smaller pipe is to be gripped, the saddle may be adjusted by moving it upwardly so as to properly grip the pipe between the clamping arms, the gripping or bearing faces of the arms being properly angled.

In the event that it is necessary to adjust cam rollers 72, such can be accomplished by movement of the mounting of the cam roller shaft 84 (Fig. 7). The cam roller shaft 84 is eccentrically mounted on stub shafts 85, 86, said shafts being rotatably mounted in frame members 87, 88. It is to be noted that the center line of the shafts 85, 86, is off-center relative to the center line of shaft 84. Arm 89 can be mounted on the end of and keyed to shaft 85, said arm having a suitable releasable means 91 for holding it in any of several adjusted positions. Rotation of arm 89 will rotate the roller shaft 84 on its eccentric shafts 85, 86, so that the roller will be adjustable relative to the frame.

A further modification is illustrated in Figure 8 wherein clamping arms 100, 101 are pivotably mounted at 102, 103 to movable means 104. Movable means 104 is reciprocable by means of a hydraulic motor 105 located between the clamping arms. Saddles 106 are provided for receiving various sizes of pipes as illustrated. Counterweights 107, 108 can be vertically adjusted on rods 109, 110, said rods being carried by clamping arms 100 and 101. Suitable rotating means can be provided to simultaneously rotate shafts 115 and 116 so as to adjust the position of each counterweight at the same time, one form of rotating means being illustrated in Figure 9. Cam rollers 111 and 112 can be mounted on the carriage frame 112 as in the heretofore described arrangements. Rollers 113 serve to support the traveling carriage on the machine frame 114.

The arrangement in Figure 9 shows a modification of the adjustable counterweight of Figure 8 and shows a means for simultaneously adjusting the counterweights which could also be used with the construction of Figure 8. Weight 130 is screw-threadedly engaged at 131 with rotatable shaft 132, the clamping arm 133 carrying rotatable shaft 132 and weight 130. The clamping arm can be pivotally mounted at 134 to movable means 135. Universal joint 136 (diagrammatically shown) connects the lower end of rotatable shaft 132 with gear 137, gear 137 being used to drive chain 138, which in turn drives gear 139 connectable with a similar arrangement for the other clamping arm.

The clamping means described herein can be used for various purposes and the details of construction can be varied without departing from the spirit of the invention except as defined in the appended claims.

What is claimed is:

1. In a clamping mechanism for pipe testing and the like, the combination comprising a frame means, an article receiving saddle on said frame means, a reciprocable means, a pair of clamping arms pivotally mounted on said reciprocable means and movable into and out of clamping relationship relative to each other, cam means on said frame means coacting with said clamping arms for movement thereof, said cam means being related to said clamping arms so that as said arms move upwardly, the clamping arms move above a plane of access to the saddle and then the clamping arms move inwardly into clamping relationship relative to each other as the upward movement of the arms continues, and motor means mounted on said frame, said motor means being located under said saddle and between said clamping arms and being connected with said reciprocable means.

2. In a clamping mechanism for pipe testing and the like, the combination comprising a frame means, an article receiving saddle on said frame means, a reciprocable means, clamping arms pivotally mounted on said reciprocable means and movable into and out of clamping relationship relative to each other, said arms having cam surfaces thereon, cam means on said frame means coacting with said cam surfaces and moving said arms in one direction relative to each other, counterweights for moving the arms in an opposite direction relative to each other, said cam means being related to said clamping arms so that as said arms move upwardly, the clamping arms move above a plane of access to the saddle and then the clamping arms move inwardly into clamping relationship relative to each other as the upward movement of the arms continues, and motor means mounted under said saddle so as to reduce the height required for said clamping mechanism said motor means being connected to said reciprocable means and being movable in a direction toward said saddle to move said arms into article clamping relationship.

3. The clamping mechanism according to claim 2 wherein the counterweights have adjusting means connecting said counterweights to said clamping arms.

4. The clamping mechanism according to claim 2 wherein the counterweights have adjusting means connecting said counterweights to said clamping arms, and means connecting said adjusting arms together so as to enable simultaneous adjustment thereof.

5. In a clamping mechanism for pipe testing and the like, the combination comprising a frame means, an article support, a motor means located beneath said support, a reciprocable cross arm means connected to said motor, a pair of clamping arms pivotally mounted on said cross arm means on either side of said motor, cam means mounted on said frame outside of said clamping arms, counterweights mounted on said clamping arms and tending to move them apart, and cam following surfaces on said clamping arms coacting with said cam means and moving said clamping arms together as said cross arm means and clamping arms are moved upwardly by said motor means into clamping relationship with said article support.

6. In a clamping mechanism for pipe testing and the like, the combination comprising a frame means, an article support, a motor means located beneath said support, a reciprocable cross arm means connected to said motor, a pair of clamping arms pivotally mounted on said cross arm means on either side of said motor, cam means mounted on said frame outside of said clamping arms, and counterweights mounted on and projecting outwardly from said arms and tending to move said clamping arms apart, said counterweights having surfaces coacting with said cam means for moving said clamping arms together as said reciprocable means is moved, said cam means being related to said clamping arms so that as said arms move upwardly, the clamping arms move above a plane of access to the article support and then the clamping arms move inwardly into clamping relationship relative to each other as the upward movement of the arms continues.

7. In a clamping mechanism for pipe testing and the like, the combination comprising a frame means, an article support, a motor means located beneath said support, a reciprocable cross arm means connected to said motor, a pair of clamping arms pivotally mounted on said cross arm means on either side of said motor, cam rollers eccentrically mounted on said frame means outside of said clamping arms, counterweights mounted on said clamping arms and tending to move them apart, and cam following surfaces on said clamping arms coacting with said cam rollers and moving said clamping arms together as said cross arm means and clamping arms are moved upwardly.

8. In a clamping mechanism for pipe testing machines and the like, the combination comprising a frame means, an article receiving support on said frame, a reciprocable means, a motor connected to said reciprocable means for moving the same toward and away from said support, a pair of clamping arms pivotally mounted on said reciprocable means, cam means mounted on said frame means, counterweights mounted on said clamping arms and tending to move them apart, cam following surfaces on said clamping arms co-acting with said cam means and moving said arms together as said reciprocable means is moved upwardly, and inturned ends on said clamping arms with article engaging surfaces angularly disposed relative to the longitudinal axis of the clamping arms, said surfaces being angled relative to the clamping arms so that a large percentage of the upward force exerted by the motor is exerted downwardly on an article engaged therewith.

9. In a clamping mechanism for pipe testing and the like, the combination comprising a frame means, an article receiving saddle on said frame means, a reciprocable means, a pair of clamping arms pivotally mounted on said reciprocable means and movable into and out of clamping relationship relative to each other, cam rollers adjustably mounted on said frame means for moving said clamping arms in one direction relative to each other, counterweights mounted on said clamping means for moving the clamping arms in opposite directions relative to each other, and motor means connected to said reciprocable means and mounted under said saddle so as to reduce the height required for said clamping mechanism, said clamping arms moving into clamping position above the plane of access to said saddle.

LEO HOFFMAN.

References Cited in the file of this patent

UNITED STATES PATENTS

| Number | Name | Date |
|---|---|---|
| 148,113 | Fifield et al. | Mar. 3, 1874 |
| 1,261,432 | Parslow | Apr. 2, 1918 |
| 1,498,879 | Lofland | June 24, 1924 |
| 1,506,075 | Neal | Aug. 26, 1924 |
| 1,612,317 | Reed | Dec. 28, 1926 |
| 2,264,508 | Carson | Dec. 2, 1941 |
| 2,269,754 | Bernhardt et al. | Jan. 13, 1942 |
| 2,284,972 | Carson | June 2, 1942 |
| 2,340,653 | Fiegel | Feb. 1, 1944 |
| 2,396,614 | Somes | Mar. 12, 1946 |
| 2,497,193 | Webb | Feb. 14, 1950 |